United States Patent [19]
Gasbarro

[11] 3,945,311
[45] Mar. 23, 1976

[54] APPARATUS FOR PRE-HEATING POULTRY PRIOR TO COOKING

[76] Inventor: Geno N. Gasbarro, 1305 Noe-Bixby, Columbus, Ohio 43227

[22] Filed: Aug. 16, 1973

[21] Appl. No.: 388,826

[52] U.S. Cl. .................. 99/483; 99/348; 259/113
[51] Int. Cl.² .................................. A47J 30/24
[58] Field of Search ............ 99/483, 348, 403, 409, 99/407, 330; 259/100, 101, 112, 113, 123, 124, 70, 47, 27, 20, 21; 68/4

[56] References Cited
UNITED STATES PATENTS
3,655,411  4/1972  Albright ............................... 99/407

*Primary Examiner*—Robert W. Jenkins
*Attorney, Agent, or Firm*—Cennamo; Kremblas; Foster

[57] ABSTRACT

An apparatus to preheat food products prior to actual cooking which is characterized by a tray for carrying the food products mounted for reciprocation within a reservoir filled with water at a given temperature. The reciprocating movement effects efficient mixing of the hot water entering the reservoir to assure that the food products are efficiently exposed to the hottest water available in the reservoir. The apparatus also includes unique combination of valve means and flow control means to effect reciprocation of the tray at given time intervals and a continuous addition of hot water to the reservoir during a complete pre-heating cycle.

2 Claims, 4 Drawing Figures

APPARATUS FOR PRE-HEATING POULTRY PRIOR TO COOKING

BACKGROUND

The present commercial cooking time for chickens at an original temperature of 32° F. is approximately 16 minutes. By pre-warming chickens to room temperature 72° F, the cooking time can be shortened by at least 5 minutes. This permits the backlog of cooked chicken to be built up sooner than before. Also the shorter cooking time is convenient when demand exceeds the supply of cooked chickens. The customer is kept waiting as short a time as possible.

Another advantage of reduced cooking time is that parking lot spaces are occupied a shorter time. Many of the fast food stores have limited parking spaces, therefore, the sooner the customer is served, the sooner his parking space is available. Many potential customers may drive on if no parking space is available.

Many store managers have been known to allow the chicken to warm up to room temperature by bringing the boxed, uncooked chickens out of the cooler and allowing them to remain at room temperature for several hours. This not only is inconvenient from the standpoint of many boxes sitting in the kitchen, but can be harmful to the chickens. As soon as the temperature of chicken gets above 35° F., enzyme action occurs and the bacteria growth increases rapidly. This affects the flavor and could result in spoilage. Also the natural juices have a tendency to drain off when the uncooked product sets for long periods. Some store managers place the chickens in the sink and run hot water over them to increase the temperature prior to cooking. This method not only prevents the sink from being used for its intended purposes, but also could cause problems with the Board of Health. In addition, the skin of the chicken becomes tough when it is exposed to hot water temperatures (approximately 160° F). Further, this method is not exact and requires at least some significant time by an employee to watch over the product.

Fast food services such as chickens or the like require efficient as possible preparation time to be successful.

SUMMARY OF THE INVENTION

The present invention relates to means for reducing the cooking time of refrigerated food products, chicken for example, as commercially prepared in the fast food industry.

In accordance with the present invention, a reservoir to be filled with warm water is provided and includes a cylinder means in the bottom thereof. A tray designed to hold the food products is removably disposed in the reservoir and includes piston means adapted to reciprocate in the cylinder means.

A plurality of valve means are employed to control the level of water that enters the reservoir. One of the valve means in cooperation with a separate chamber provided with an orifice communicating with said reservoir also functions to effect the reciprocation of the piston connected to the tray to raise and lower the tray. This provides a mixing action of the water in the tray to obtain efficient heating of the food products disposed thereon.

OBJECTS

It is a primary object of the present invention to provide an apparatus which pre-heats refrigerated foods prior to actual cooking to effectively reduce cooking time.

It is another object of the present invention to provide an apparatus of the type described which is of relatively inexpensive construction and which is simple and dependable in operation.

It is a further object of the present invention to provide an apparatus of the type described wherin a unique combination of simple valve means provides not only control of hot water into a reservoir in which the food products are disposed but which also cooperate to effect reciprocation of the food products in the reservoir to efficiently mix the water therein to maintain a relatively even temperature in the water.

Further objects and advantages of the present invention will be apparent from the following description, reference being had to the accompanying drawings wherein a preferred form of embodiment of the invention is clearly shown.

IN THE DRAWINGS

DETAILED DESCRIPTION

Figure 1:
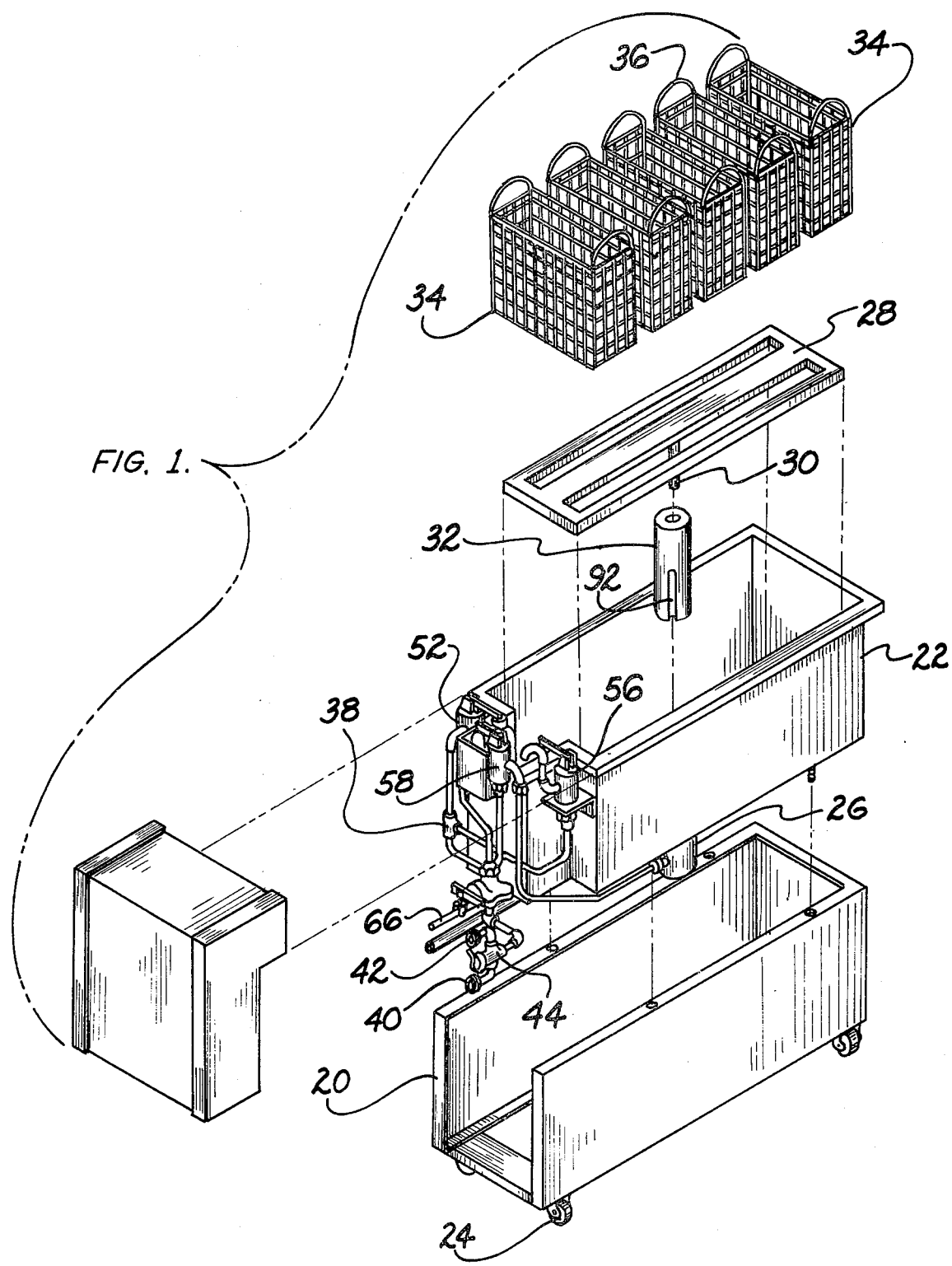
FIG. 1 is an exploded perspective view of an apparatus for pre-warming refrigerated food products constructed in accordance with the present invention.

An apparatus for warming refrigerated food products prior to cooking constructed in accordance with the present invention is illustrated in FIG. 1, and includes a housing means which comprises a base cabinet 20 which supports a pre-heat reservoir 22 which may be fixed to cabinet 20 in any suitable conventional manner. Cabinet 20 is preferably provided with castor wheels such as 24 to provide convenient mobility to the structure.

Reservoir 22 includes a cylinder means 26 provided in the bottom surface. A food tray 28 includes a downwardly extending pin 30 which is adapted to receive a piston means 23. Product baskets 34 are adapted to hold a predetermined amount of the food product and are adapted to rest upon the surface of tray 28 with the handle portion 36 being at a height above the top of reservoir 22 to permit convenient handling of the baskets.

A plurality of valve means, indicated generally at 38, are provided to control the flow of water into reservoir 22, to cooperate with a chamber and orifice to cause reciprocation of the cylinder 32 in piston 26, and to shut-off the flow of water after a predetermined time cycle has occurred.

Figure 2:
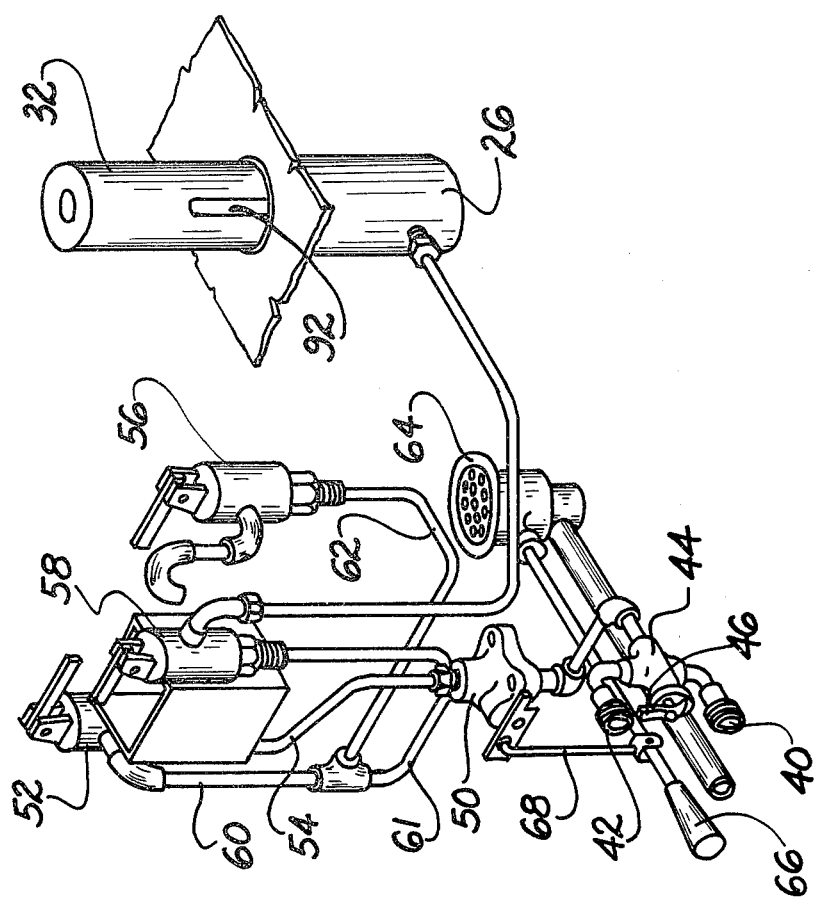
FIG. 2 is a perspective view of a portion of the apparatus shown in FIG. 1 illustrating the basic valve means and associated conduits which form a portion of the present invention.
Figure 3:
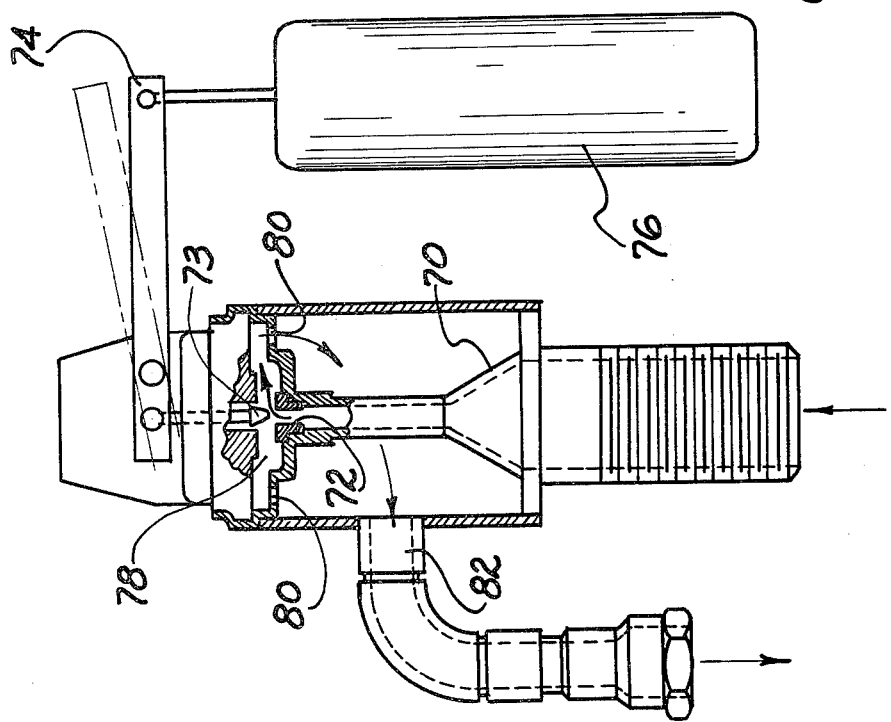
FIG. 3 is a side elevational view partially in section illustrating a typical valve which is employed in the apparatus of the present invention.

Referring now specifically to FIGS. 2 and 3, a pair of water supply conducts 40 and 42, which are preferably connected to a source of conventional cold and hot tap water not shown communicates with a conventional mixing valve 44. Adjustment of lever 46 permits the adjustment of the temperature of the water exiting valve 44. The outlet of valve 44 is communicated via conduit 48 to a conventional on-off master valve 50 which inturn communicates to a maximum level control valve 52 via conduit 54.

Water is communicated from the outlet of valve 52 to a fill valve and to a piston control valve 58 via conduits 60, 61 and 62.

A drain 64 is provided with a handle 66 which is connected by a linkage means 68 to master valve 50. The linkage is constructed such that the opening of drain 68 via handle 66 also operates to close master valve 50 so that no water can enter the reservoir via the other valve means.

FIG. 3 illustrates the conventional float valve which may be utilized for valves 52, 56 and 58.

Figure 4:
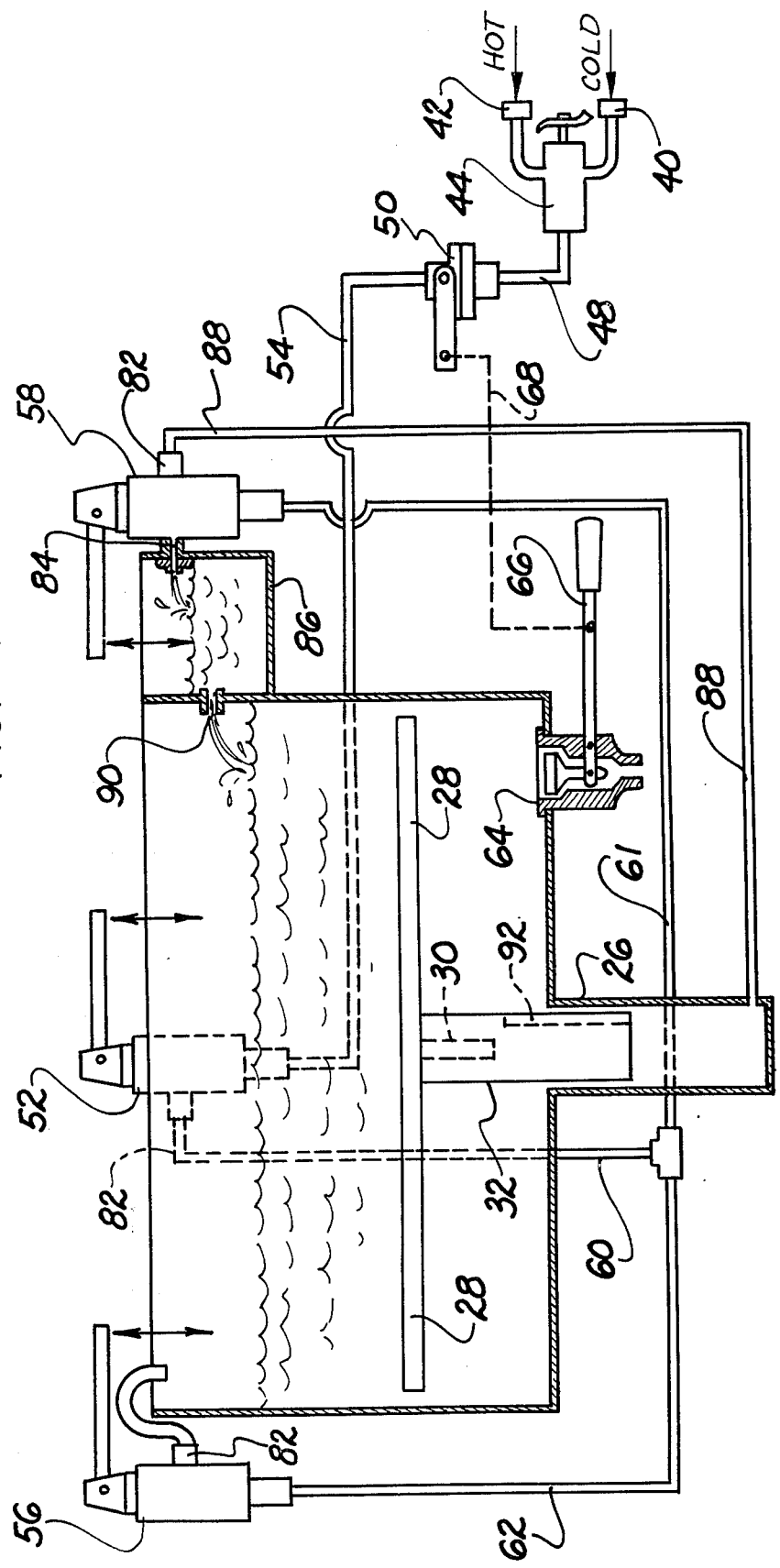
FIG. 4 is a diagrammatical view of an apparatus constructed in accordance with the present invention illustrating the cooperation and function of the various valve means and associated structures.

Each valve is provided with an inlet 70 which communicates with a valve seat 72 which is opened or closed by a valve element 73. Element 73 is responsive to a lever 74 connected to a float 76. In the open position, water exits valve chamber 78 via holes 80 and then proceeds outwardly via outlet 82. As best seen in FIG. 4, piston control valve 58 includes a modification in that it is provided with a second outlet 84 which communicates with a chamber 86 which will be described more fully later herein.

As previously described, closing the drain 64 by manipulating handle 66 also opens master valve 50 to permit hot water to flow into maximum level control valve 52.

Water is thereby introduced into fill valve 56 and into piston control valve 58. The float on valve 56 is disposed at a level such that when a sufficient quantity of water has entered reservoir 22, it is designed to close. Then the only water that can enter reservoir 22 is derived from valve 58.

Water is emitted from valve 58 via the first outlet 82 which is connected to an opening in the lower portion of cylinder 26 via conduit 88. Simultaneously therewith, a flow of water occurs through orifice 84 which communicates with chamber 86.

The float associated with valve 58 is disposed in chamber 86 which also includes an opening or orifice 90 communicating with reservoir 22. The orifices 84 and 90 are designed such that the flow rate through orifice 84 is greater than the flow rate through orifice 90. Therefore the level of water will gradually increase in chamber 86 until the float connected to valve 58 arises to a shut-off position to stop the flow of water. Then with valve 58 in the off position, water will flow only through orifice 90 until the level of water is equal to the height of orifice 90. The float is disposed in chamber 86 such that when this above mentioned condition is reached, it has lowered sufficiently to actuate the opening of valve 58 to permit water to flow out of orifice 84.

When valve 58 is in the open position described, water is also introduced into cylinder 26 via outlet 82 and conduit 88. This flow of water increases the pressure in cylinder 26 to effect the rise of piston 32 and therefore tray 28 in reservoir 22.

Preferably piston 32 is of relatively loose fit in cylinder 26 such that when water is no longer communicated into cylinder 26, as when valve 58 is closed, piston 32 will settle downwardly. However, to assure a relatively slow rate of rise and fall of piston 32, and to limit the height to which piston 32 will rise, a slot 92 is provided in a lower portion of the side wall of cylinder 26. This permits water to exit cylinder 26 via slot 92 and equalize the water pressure to permit the cylinder to fall.

Since the differential flow rates between orifices 84 and 90 effect the repetitive opening and closing of valve 58, piston 32 is caused to reciprocate in cylinder 26 as water pressure is alternately increased and decreased in cylinder 26.

Since the cold food products which are to be placed on tray 28 soon create a temperature differential in the water immediately surrounding them, the reciprocation of piston 32 and tray 28 serves to gently agitate the water in reservoir 22 to maximize the contact of the food products with the warmer water in reservoir 22.

The flow rates of orifices 84 and 90 are predetermined to effect approximately a 15 to 20 second cycle time between the rise and fall of piston 22. It should also be pointed out that the rise and fall of piston 32 is relatively gentle so that the food products on tray 28 are never stationary for more than a few seconds at a time. While in a given application, the time cycle of the reciprocation of piston 32 may be adjusted by varying the flow rates of the orifices 84 and 90, it has been found that an approximately twenty second cycle works well when chicken parts representing 26 chickens are to be pre-warmed from 32° F to about 120° F.

The total batch time for the pre-warmer of the present invention is automatically determined by the level of water in reservoir 22. As soon as the water level reaches a predetermined height, the float associated with valve 52 will rise to cause the closing of valve 52 which prevent water from reaching valve 58. At this point, no water can enter reservoir 22 from any source and the warming cycle is completed. The flow of water into reservoir 22 via valve 58 is regulated in such a manner that the total cycle time is sufficient to warm the food product capacity from approximately 32° F to 120° F. A typical complete warming cycle for an apparatus constructed in accordance with the present invention with a capacity for 20 chickens is approximately ten minutes.

After the total run is completed, the operator merely actuates handle 66 to open drain 64 which also closes master valve 50. As the reservoir 22 is permitted to drain empty, the food products are removed via vaskets 34 and a new batch can be readied as needed.

What is claimed is:

1. An apparatus for pre-heating refrigerated food products comprising, in combination, housing means including a reservoir; a supply of water at a predetermined temperature that can be introduced into said reservoir at less than approximately 160° F; valve means communicating with said reservoir and with said supply of water to control the flow rate introduced into said reservoir; tray means mounted in said reservoir and adapted to receive said food products; a piston mounted for reciprocating in a cylinder, said piston being in force-transmitting engagement with said tray means for predetermined repetitive movement of said tray means in said reservoir; and control means for effecting reciprocation of said piston including a chamber provided with an inlet and an outlet and valve means communicating a source of water to said chamber and to said cylinder, said valve means being responsive between on and off positions to the level of water in said chamber which in turn is responsive to the relative flow rates between said chamber inlet and outlet.

2. The apparatus defined in claim 1 wherein said cylinder is formed in the bottom surface of said reservoir and wherein said piston includes a side wall provided with a vertically disposed slot spaced from the upper portion of said piston; said slot forming a passage means communicating said cylinder with said reservoir when said piston rises a predetermined distance in said cylinder to effectively limit the upward travel of said piston.

* * * * *